May 19, 1942.   J. V. MARTIN   2,283,274
SAFETY TIRE
Filed Oct. 20, 1938   4 Sheets-Sheet 4
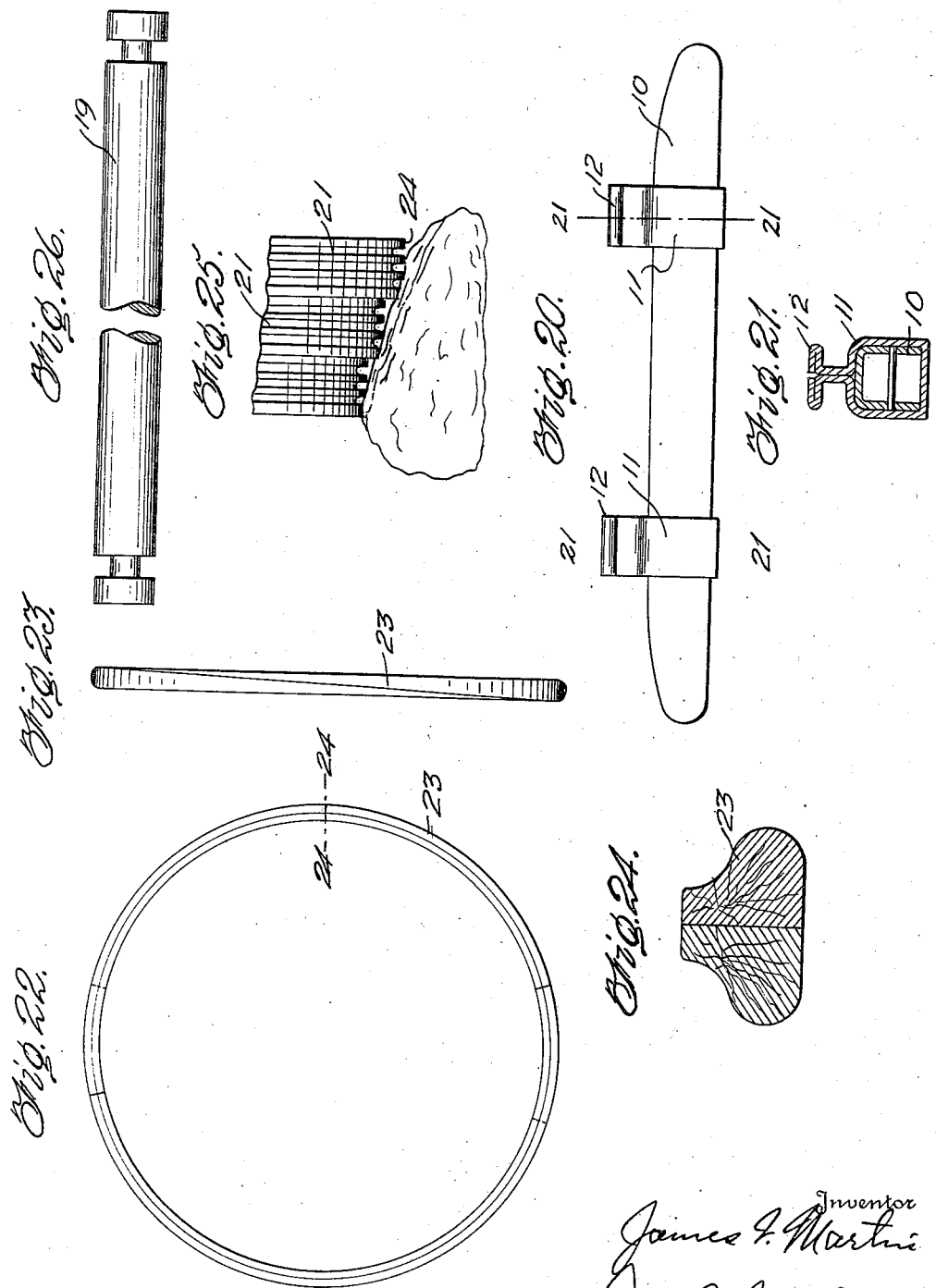

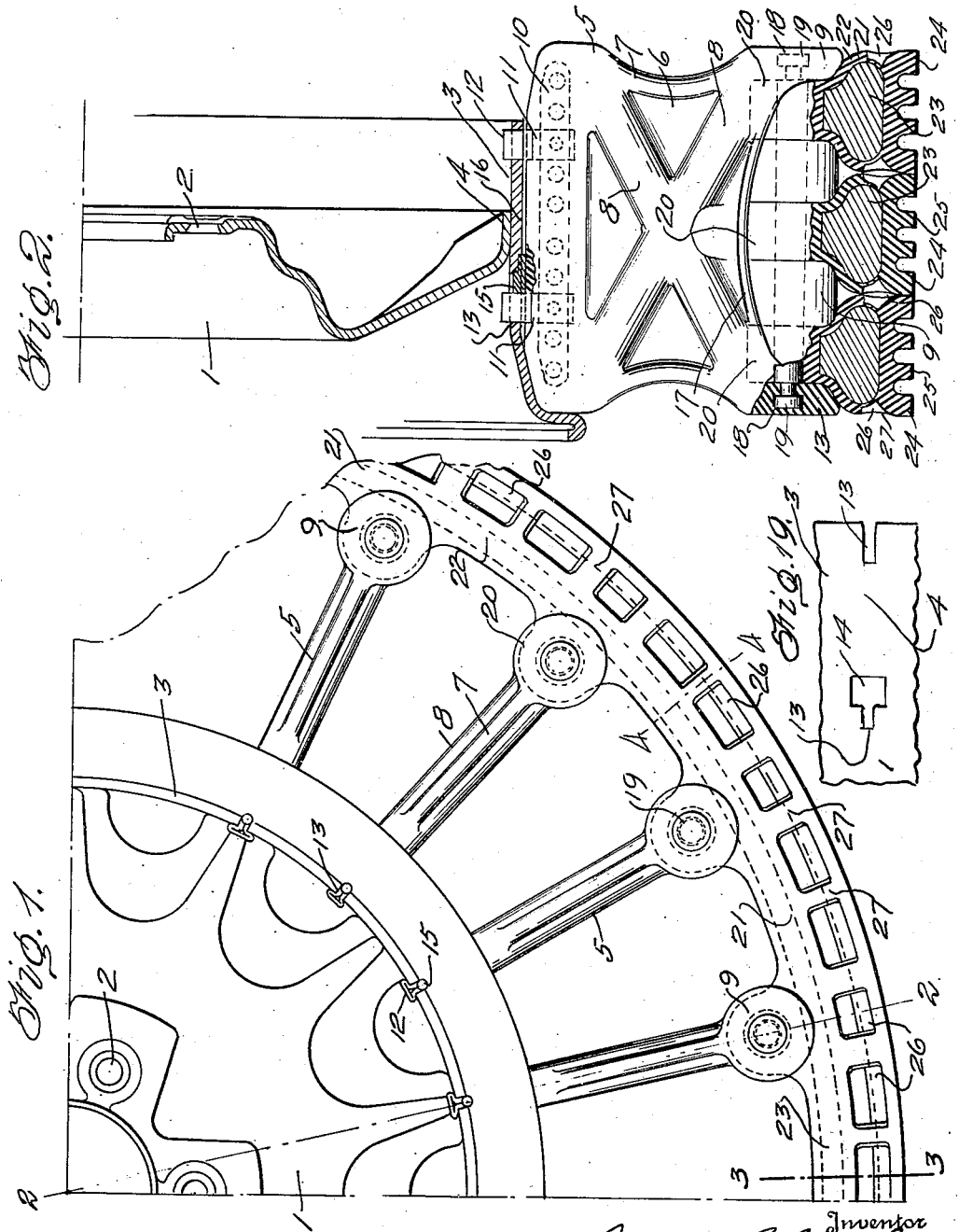
May 19, 1942. J. V. MARTIN 2,283,274
SAFETY TIRE
Filed Oct. 20, 1938 4 Sheets-Sheet 1
Inventor
James V. Martin
By Jas. V. Martin
Attorney May 19, 1942.  J. V. MARTIN  2,283,274
SAFETY TIRE
Filed Oct. 20, 1938  4 Sheets-Sheet 2
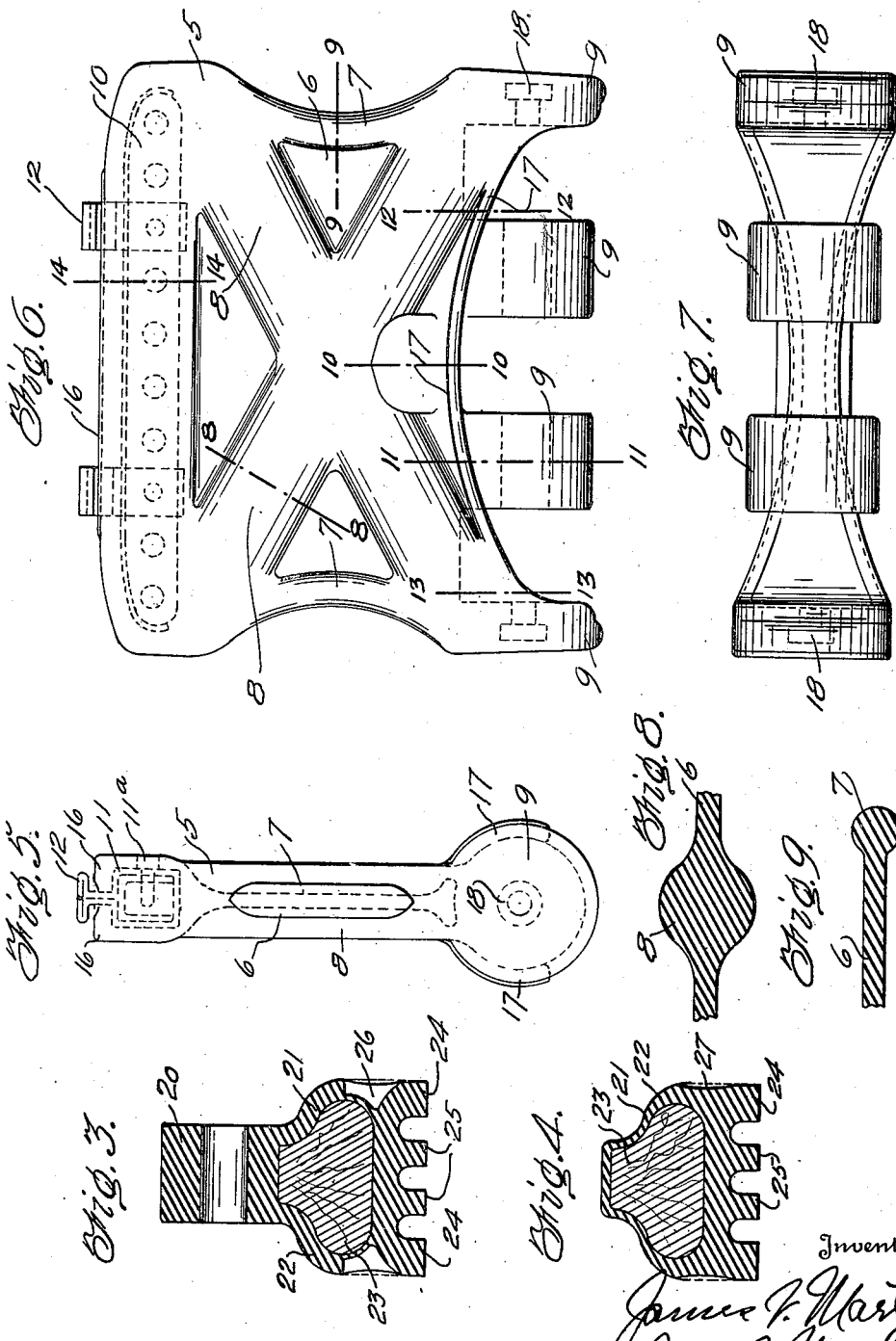

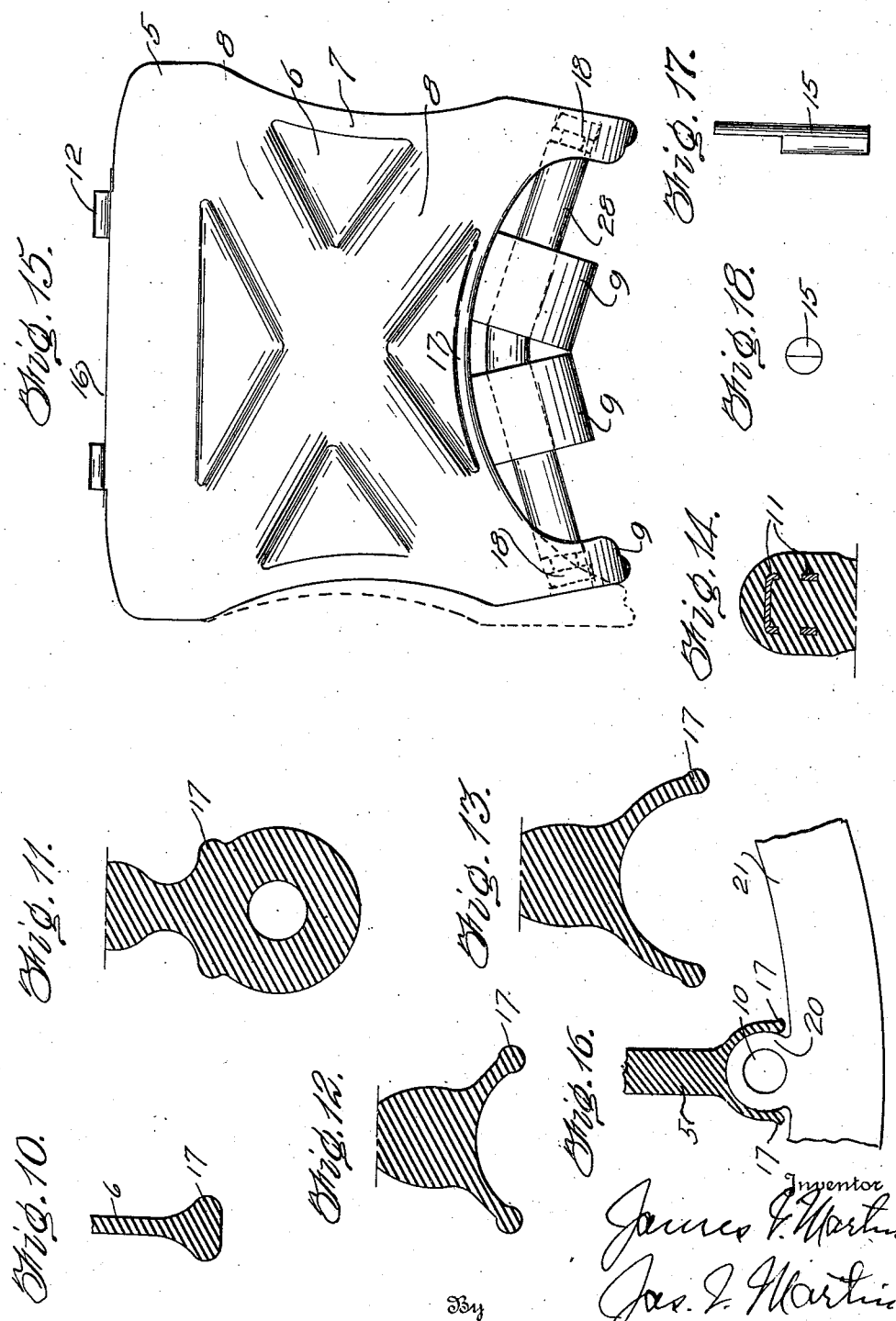

Patented May 19, 1942

2,283,274

UNITED STATES PATENT OFFICE 2,283,274

SAFETY TIRE

James V. Martin, Clintondale, N. Y.

Application October 20, 1938, Serial No. 236,103

14 Claims. (Cl. 152—7)

My invention relates to tires for use on road vehicles and aeroplanes and aims to provide a more efficient medium between the road inequalities and the axles for the wheels of automobiles than has heretofore been available.

The primary object of my invention is to eliminate the great loss of life and the large number of injuries as well as the annual loss of hundreds of millions of dollars due to blow-outs and punctures. Closely associated objects are as follows:

To afford easier riding quality, particularly at high speeds and to keep the tire structure at comparatively low temperatures at high speeds.

To secure greater lateral strength in a tire while at the same time providing a greater vertical range of movement.

To provide a larger proportionate road engaging surface of a uniformly yielding character.

To provide a tire having much less bouncing and skidding tendencies than the inflated tires.

To provide a sturdy tire built up of units many of which can be destroyed without endangering the ability of the remaining units to function as a safe tire for travel at high speeds, and permitting easy and economical replacement of parts.

To do away with the necessity for vehicles to carry spare tires and to require the frequent servicing of tires and tire valves.

To improve the structures disclosed in my pending applications Serial No. 27,603, entitled Tire and wheel combinations, filed June 20, 1935, which matured into Patent 2,235,378, March 18, 1941, and Serial No. 86,872, entitled Tire and tire tread, filed June 23, 1936.

Other objects of my invention will be manifest as I proceed to disclose the invention by means of the following drawings and descriptions which illustrate one or more specific embodiments thereof.

Fig. 1 is a side elevation sector of my invention mounted on a typical automobile wheel and showing the outline in dotted lines of certain remote parts located within rubber, also four typical spokes of a 20 spoke tire assembly.

Fig. 2 is a view, partly in section, taken at right angles to Fig. 1 along the line 2—2 of Fig. 1.

Fig. 3 is a view in section taken along the line 3—3 of Fig. 1 and showing an enlarged view of one of my tread hoops.

Fig. 4 is another sectional view of one of my tread hoops, but taken along the line 4—4 of Fig. 1.

Fig. 5 shows an end elevation of one of my rubber spokes.

Fig. 6 shows a view of one of my spokes at right angles to Fig. 5.

Fig. 7 is a view looking upward at the lower end of the spoke.

Figs. 8, to 14 inclusive illustrate the respective forms which the spoke parts take at the section lines correspondingly numbered on Fig. 6. Fig. 15 illustrates an extreme application of the lateral tension principle applied to the lower part of a spoke. And Fig. 16 shows an alternative form of hoop lug adapted for the type of spoke shown in Fig. 15. Fig. 17 shows an enlarged view of the locking means for retaining my spokes in their rim connections and Fig. 18 is an end view of the same locking means seen in Fig. 17.

Fig. 19 shows typical hole and slots in the wheel rim for attaching one of my elastic spokes thereto, while Fig. 20 shows one of my internal spoke spacers with strap attachments for the wheel rim connection and Fig. 21 shows both the spacer and the strap taken on the line 21—21 of Fig. 20. Fig. 22 shows one of my fibrillose hoop fillers, indicating the glued joints thereof and Fig. 23 shows an end elevation of the said hoop filler, while Fig. 24, shows in normal size a cross-section of the said filler taken on the line 24—24 of Fig. 22. Fig. 25 illustrates how the tread ribs and hoops of my tire adapt themselves under load to conform to the obstacles in the road. Fig. 26 shows a view broken at the center of one of my hickory locking pins to attach a spoke to the tread hoops.

Proceeding with the more detailed description of my invention similar numerals will be applied to similar features throughout the several views: 1 represents the typical disc of a vehicle wheel having bolt holes 2 for attachment to a wheel hub. 3 is a wheel rim of simplified form particularly adapted for attachment of my type of tire spokes and either welded or riveted to the wheel disc at 4. 5 shows one of my molded rubber tire spokes including a web portion 6 having a bead 7 at the said spoke's lateral margin and diagonally crossed ribs 8 for lateral strength of the tire. It will be noticed that the ribs 8 blend gradually into the web and bead portion of the spoke 5; also the webs blend gradually into lugs 9 which form the spoke 5 connections to the tire tread, and like blending of the web should be noted toward the inner margin of the spoke where it incloses a spacer 10 having metal straps 11 around it, which straps have T shaped upper parts 12 which protrude from the rubber spoke and form a ready and firm connection with the rim 3 by wedging within rim slots 13. It will be noticed in Figs. 1, 2 and 19 that between the outer strap 11 and the disc-rim connection 4 a rim hole 14 has been punched large enough to admit the T section 12 of the strap 11, so that both straps can be shoved laterally into the final position of the spoke as shown in Fig. 2. After that is accomplished I provide a locking shape 15 of metal, see Figs. 17 and 18 the small end of which can be forced under the rim so that the rubber on the top of the spoke will hold it firmly in place with its larger round end retaining the outer strap 11 in its rim slot position. While I have shown the spacer 10 as a stamped U channel located within the straps 11 and cured by well known brass plating methods to the rubber of the spoke an equally strong and serviceable construction is to use a piece of hickory shaped in the outline of the U channel, but solid instead of hollow. To obtain the saving of weight and cost obtained by using the wood to replace the metal spacer I advise use of a special bonding agent consisting of rubber latex or uncured rubber in liquid form and mixed with the proper proportion of sulphur and other well known chemicals so that under the temperature and pressure desired for the molding of the rubber spoke the liquid rubber will form a firm bond between the gum of the rubber spoke and the wood fibres. I dip or paint the liquid uncured rubber on the wooden spacer 10 and allow same to dry to a pasty consistency, then insert the spacer with its straps attached into the hollow rubber mold and surround the filler spacer with a compound to be cured under pressure. I find that from ¾ to an hour of time and at temperatures of approximately 300 degrees Fahrenheit and at pressures of about 2,000# per square inch a very good compound can be cured and bonded to the wood. The liquid rubber in uncured form enters the pores of the wood and also combines with the uncured gum to make an integral rubber when cured; variations in the compound used should have corresponding variations in the chemical proportions used in the liquid rubber bonding material. Thus it will be seen that I have an ideal spoke-rim connection: i. e., one that saves time, weight and complication and for extra precaution against looseness I have provided high edges or ribs 16 on the spokes displaceable on assembly, see Fig. 5 so that the spoke connection will not rock when the brake or drive torque bends the spokes.

The opposite end or outer end of my elastic spoke has numerous novel and useful features as well, for example it will be noticed (Figs. 6 and 15) that the lateral width of my spoke (when the same is relaxed) is much less width than its inner part and has a lower bead 17, also button head pockets 18 are molded into the outer lugs 9 of the spoke; but by comparing the figures mentioned, which show the spoke relaxed, with the installation position of the spoke lugs, see Fig. 2, it will readily be apparent that in order to insert the hickory spool headed pin 19, the lower part of the spoke must be stretched so that the ribs 8 and the bead 17 have a powerful inward pulling effect on the outer lugs 9 of the spoke and bind these tightly against the corresponding lugs 20 of the tread hoops 21. To insert the button headed pin 19 into the outer lug pockets 18 I advise use of an inverse movement pair of pliers to stretch the neck of the pocket open around the pin head. The spokes themselves are assembled under an initial tension equal to the static weight they are intended to carry and if they are loaded additionally, as for example in traversing bumps, then the lower spokes will readily buckle at their centers, such is their shape, and allow the spokes toward the upper half of the tread rims to carry all the weight and thus obviate any shock passing directly from the ground to the axle as it does in inflated and in solid type tires. This feature affords the utmost in easy riding and slings the entire vehicle in suspension rubber.

My tread hoops are novel in several respects, each is very yieldably attached to the other through the yieldable lugs 20 which are an internal protuberance of the envelope 22 of each hoop: Then the interlocking lugs 20 of the spoke afford additional yielding so that each hoop is comparatively independently mounted in the assembly for a limited movement, see Fig. 25. This feature permits my safety type tire to have a transverse tread configuration at all times corresponding to the shape of the ground or road over which it is traveling and permits it to climb curbs with facility, the hoops acting like fingers in contacting the curb if the tire is to climb at an angle.

Even when the spokes of my tire are buckled through excessive loads on the tires, the lateral tension already described as incorporated into the bottom of each spoke will keep the lower bead and the ribs 8 in tension thus preventing lateral displacement of tire tread and wheel rim and also aiding the button headed hickory pin to always retain the lugs 9 in place.

One of the principal features of my tread hoops 21 is the fibrillose filler 23 cured therewithin.

This filler because of its shape permits the neat interlocking of lugs proportioned so that although they are of the same compound as the tread rubber they are of ample strength to carry the loads imposed: If it were not for their inner tapered shape it will be seen that the range of the spoke would be curtailed. These hoops 23 are formed up of steam bent hickory or other suitable long grained wood, thus preserving the grain and presenting it tangentially to the road surface, so that no fractures can occur across the grain. They are also strongly bonded to the rubber envelope 22 as per the method heretofore outlined for bonding the spacers within the spokes. The tread strips 24 on the outside of each hoop should be extra heavy for curb contacts and nevertheless they should be equally flexible as the inner strips 25; I obtain this combined result by the novel side tread groove 26 which has the surprising function of also centering the filler 23 accurately in molding operation also improving the appearance of the tire and lightening the tire.

By inspection of the union of spaces between two grooves at 26 in Fig. 2 it will be seen that there is a very ample displacement room for the larger tread strips 24 to move into for softness. I carry the envelope strength past the groove opening at particularly stressed places by the vertical tread ribs 27.

I have found that short joints in the fibrillose filler for the tread hoops are not dependable under constant road flexing and therefore the joints shown in Figs. 22 and 23, which carry the tapering ends of the hoop pieces very far in overlap are recommended: Thus even if the casein or other glue employed should utterly fail the fillers 23 would function bonded to and within the envelope 22. To keep the filler centered within the small space at the bottom of each groove 26 I employ a strip of gum dipped cotton wrapped around the filler and located at desirable intervals between the ribs 27 so that an even skin of rubber covers the fillers at all points. The impregnated gum cotton cures along with the thin skin, see Fig. 3, and therefore appears merely as part of the rubber skin: These strips can be approximately one inch wide and 3/32" of thickness when compressed or any other thickness depending upon the minimum amount of rubber cover desired for the fibrillose hoop at any point. The gum cotton spacers are thus located at the inner part of the recess 26 so that curb or other road contacts cannot wear them away as would be the case if they were not confined to the recess. Where extreme lateral tension is sought for the outer end of the spoke as for example in the construction shown in Fig. 15, I recommend that the molding pin 28 be bent so as to make the hickory pin hole in the lugs 9 conform thereto when the lugs are stretched into their assembled form as shown in Fig. 2 and in dotted lines in Fig. 15.

Metal pins 11a, see Fig. 5 should be used in forming either the channel 10 or a hickory substitute therefor, also the hole and pin 11a will pass through the straps 11. By following the form of the bead 17 at the lower margins of the spoke 5, see Figs. 10, 11, 12, 13, 14 and 15 it will be seen (also Fig. 16), that the bead is stretched so much laterally of the tire that it always pulls the outer lugs 9 closely toward the hoops 21 and around the spool heads of pin 19.

Thus I have disclosed a practical tire of easy riding quality and comparatively low cost: The form of the spokes which prevents them through ready buckling from carrying loads directly, or in compression, from the road to the axle gives such a delayed blow that a ride of great softness is had and my double use of the rubber to function as an assisting lock to the tread hoops while at the same time providing lateral strength through the stretched ribs 8, even when the spoke 5 is relaxed from taking the vertical wheel loads conduces to simplicity and low cost. Also I have used the side rib 27 and the deeper grooves 26 not only to center the fillers 23 during molding but these grooves and ribs enable the outer tread strips 24 to be strong and at the same time as flexible as smaller center ribs 25. This feature also lightens and cheapens and adds beauty to the tire and cooperates with the rubber lug connections 20 of the hoops and 9 of the spokes to provide a very flexible tire tread portion as illustrated in Fig. 25.

Wide variations may be had from my specific embodiments without departing from the teachings of my invention and I do not limit myself to the disclosures, but,

What I claim is:

1. In combination with a vehicle wheel, a tire carrying the wheel loads through tension elastic spokes from the upper portion of a hoop tread and means, including the rubber of the outer spoke portion held in lateral tension, to lock the said tread and spokes together.

2. A wheel rim, a tire tread, and elastic rubber tire spokes connecting the said rim and the said tread by means of interlocking rubber lugs between the said spokes and tread, a comparative inflexible pin to form part of the said connection and the outer portion of each said spoke under constant tension in a direction across the interior of the said tread, whereby the said pin is held in place.

3. In combination with a vehicle wheel rim, an elastic spoke type tire, a spacer cured to and within a rubber envelope of each of the said spokes and straps from the said spacer projecting through the envelope of each said rubber spoke; slots arranged in the said rim in a direction other than the plane of rotation and means to prevent the said straps from slipping out after the same have been inserted into the said slots.

4. The combination of a vehicle wheel rim, a tire tread portion and elastic spokes forming a yieldable connection therebetween, interlocking lugs on the inside of the said tread portion and on the outer edges of the said spokes, a locking bar passing through the said lugs and terminating within the outer wall of the outermost of the said lugs and the last said lugs located within the lateral tread faces of the said tire, whereby there is no protrusion of spoke lug or locking connection beyond the lateral margins of the said tread portion.

5. In combination with an elastic spoke type tire a tire tread portion having rubber lugs located on the inner circle thereof, corresponding lugs on the outer ends of each said spoke, a locking piece passing through holes in the said tread lugs and having an expanded end and one of the said spoke lugs molded to fit and hold the said expanded end, whereby the said piece is prevented from slipping out of place.

6. In combination with a vehicle wheel rim, a tire having a tread portion, elastic spokes carrying the wheel weights to the upper part of the said tread portion and also forming the lateral aligning means between the said rim and tread portion; connections between the said spokes and rim including rubber displaced upon assembly for holding the said connections firmly in proper position.

7. In combination with an elastic spoke type tire, a tread portion having apertured lugs, corresponding lugs on the outer portions of each said spoke, a locking pin through said lugs and a rubber bead extending between the outermost of the said spoke lugs and across the intervening lugs to prevent the said outer lugs moving outwardly.

8. An elastic spoke type tire including tread hoops attached by means of elastic lugs and rigid pins to the outer portions of the said spokes, the laterally outermost of the said lugs having a pocket therein and each end of the said pin having a button-head adapted to fit within the said pocket.

9. An elastic spoke type tire including rubber spokes having diagonally crossed ribs and lug connections to a tire tread, the said lug connections of each spoke formed to surround a rigid pin and the end lugs of each said spoke forming terminations for the said ribs and housings for the ends of the said pins, whereby the said ribs and their said terminations provide lateral strength for the said tire even when the said spokes are vertically relaxed.

10. An elastic spoke type tire having interlocking lug connections between the tire tread portion and each of the said spokes, a locking pin included as part of each of the said connections and the outermost of the said lugs held in tension against the ends of the said pins by means of rubber extending across the tire between the said outermost lugs.

11. In combination with elastic tire spokes a collocation of tread hoops cured to and within separate rubber envelopes, side grooves located in each of the said envelopes adjacent the road contacting tread thereof and located opposite each other in the said collocation, whereby displacement apertures are provided for contacting tread portions of two of the said hoop envelopes.

12. In combination with a wheel, a tire including elastic spokes carrying the wheel loads to the upper portion of flexible tread hoops, each of the said hoops provided with a core filler surrounded by an envelope of rubber, comparatively deep side grooves in the side walls of the said hoops and a thin covering of rubber for the said filler located at the innermost part of the said grooves.

13. In combination with a vehicle wheel and rim, a tire, elastic tire spokes adapted to carry the wheel loads in tension to the tire tread portion of the said tire and ready attachable means for each spoke including attachment protrusions on the inner edges of each said spoke and openings in the said rim to receive the said protrusions by a lateral sliding movement, whereby the forces such as driving and braking in the radial plane will not tend to dislodge the said protrusions.

14. In combination with an elastic tension type spoke tire, multiple tread hoops, each separately molded and assembled so that their lateral tread margins are in contact under normal road conditions and side grooves intermittently located in the said hoops and opposite each other whereby displacement spaces are provided inwardly of the said contacting margins between two of the said hoops.

JAMES V. MARTIN.